Dec. 28, 1943.  C. W. WALZ  2,337,698
BEET HARVESTER
Filed March 18, 1940   4 Sheets-Sheet 1
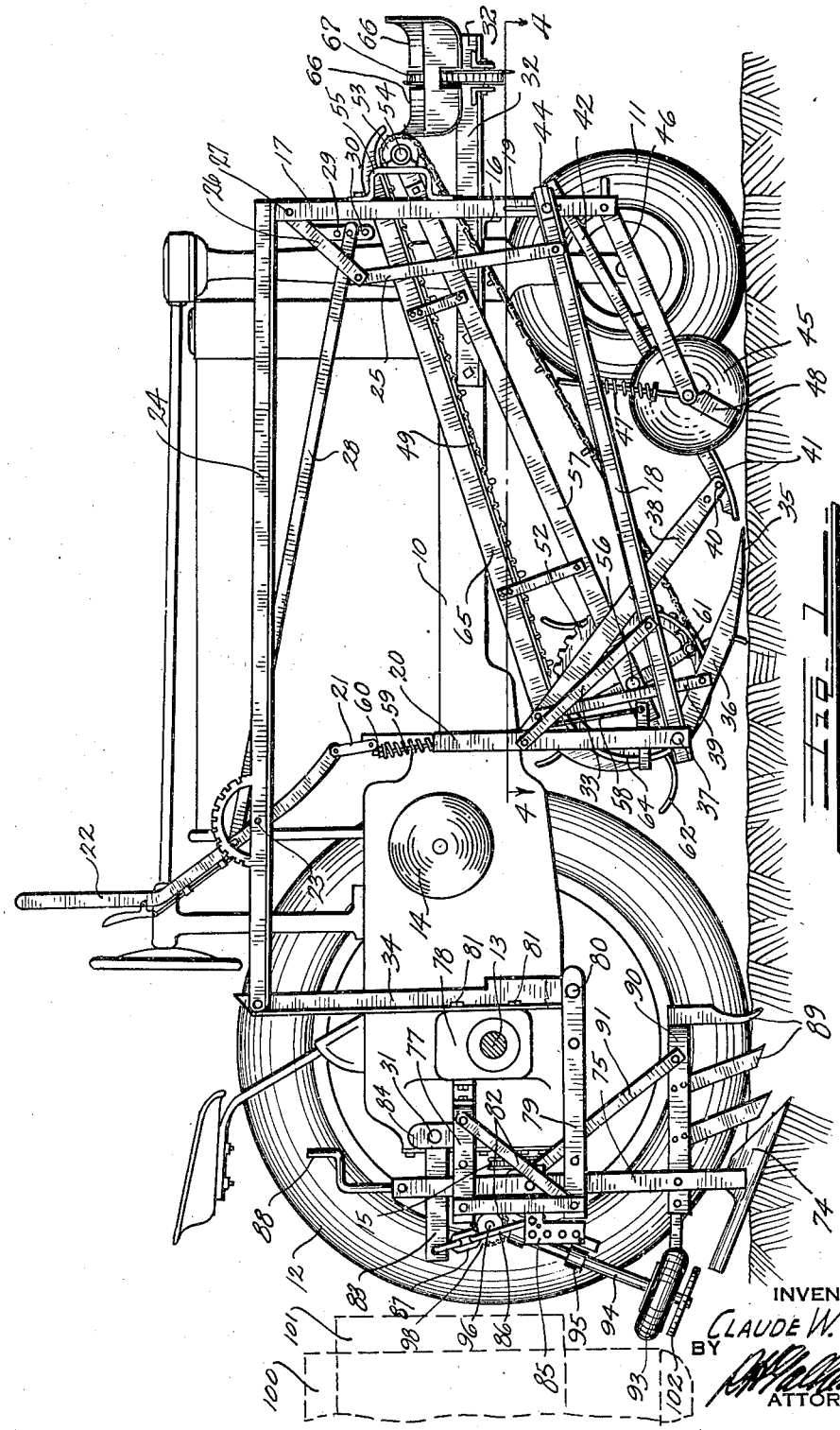
INVENTOR
CLAUDE W. WALZ
BY
ATTORNEY Dec. 28, 1943.  C. W. WALZ  2,337,698
BEET HARVESTER
Filed March 18, 1940  4 Sheets-Sheet 2
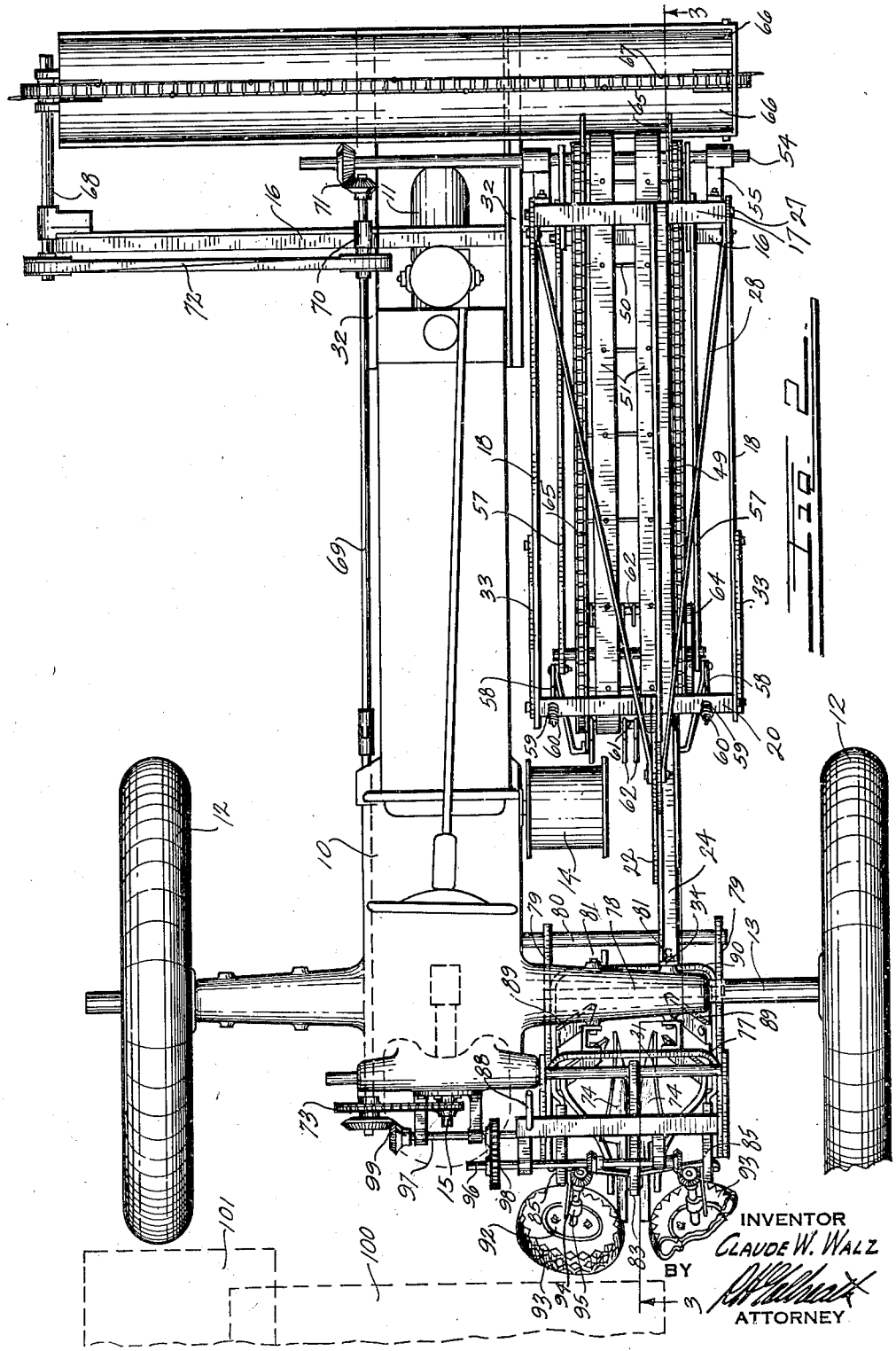
INVENTOR
CLAUDE W. WALZ
BY
ATTORNEY

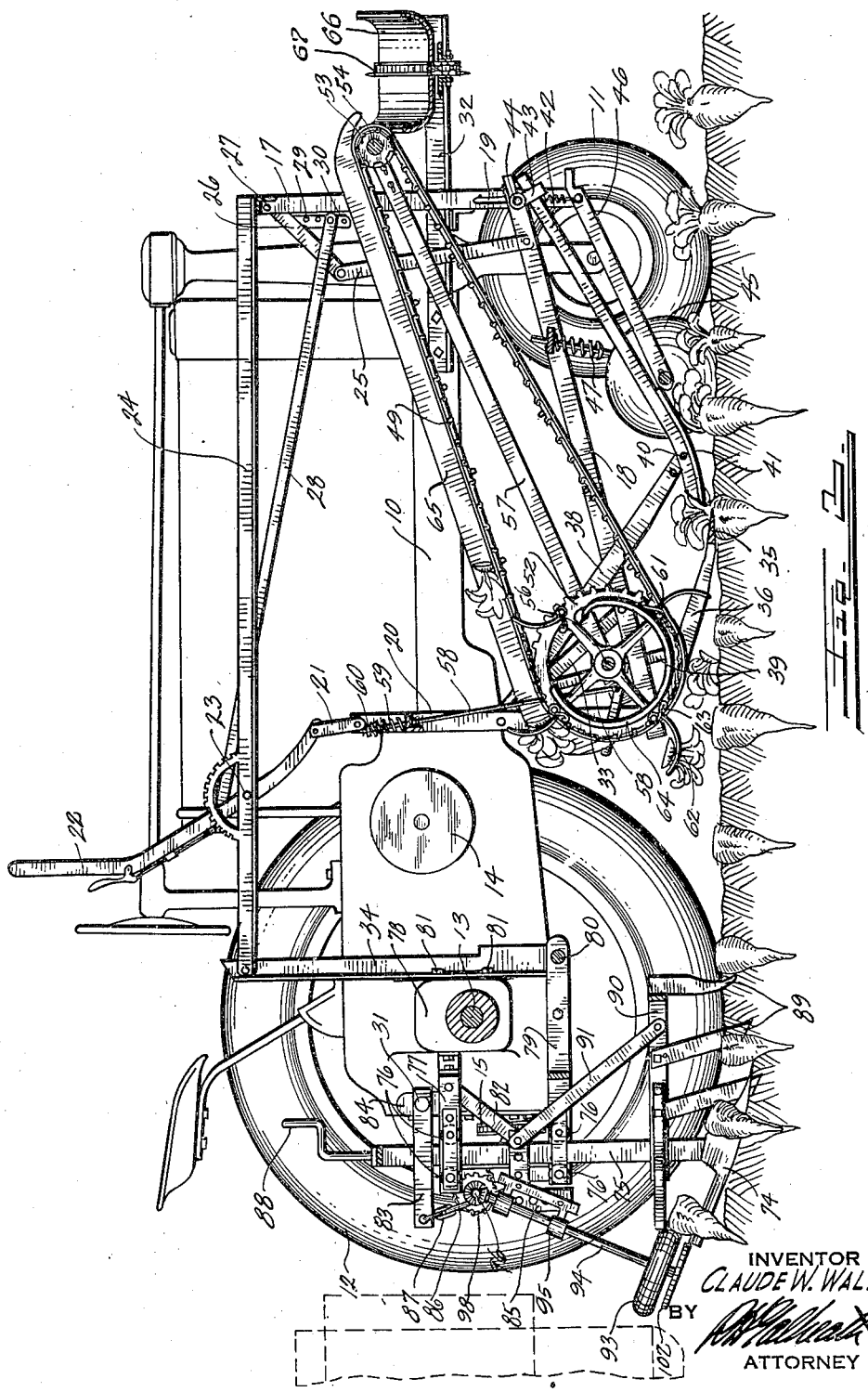

Dec. 28, 1943.                C. W. WALZ                  2,337,698
                             BEET HARVESTER
                          Filed March 18, 1940         4 Sheets-Sheet 4
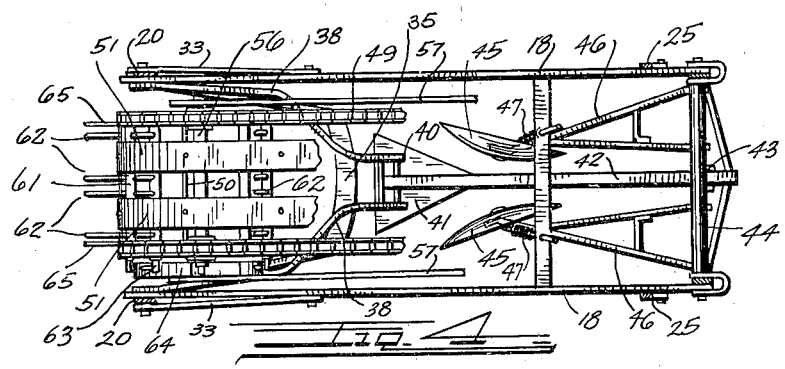
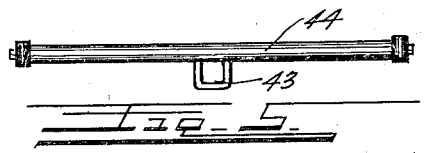
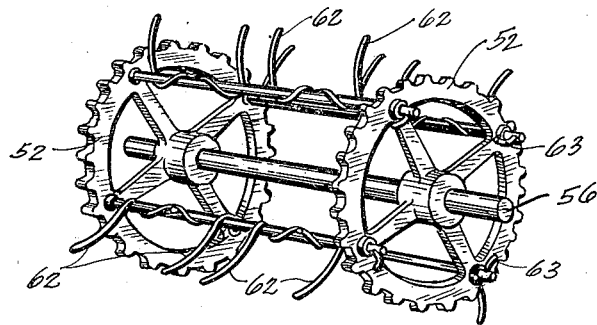
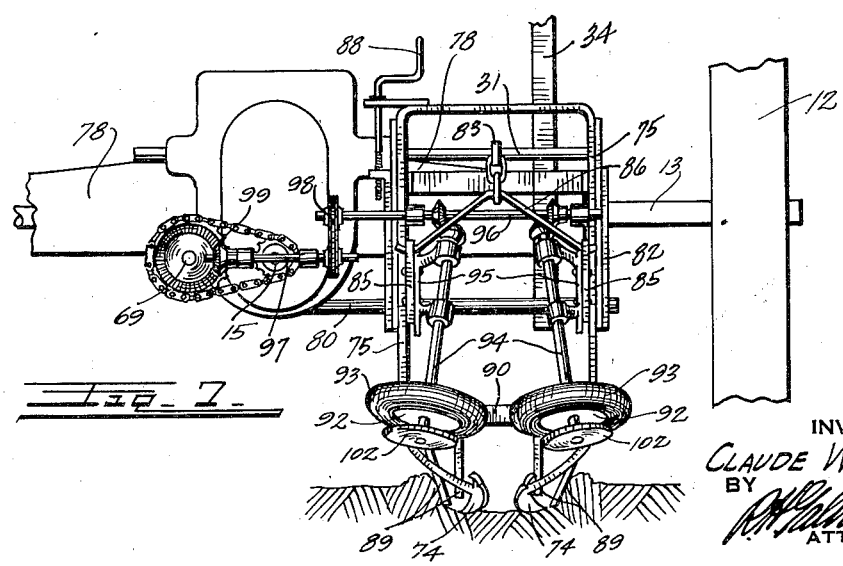
INVENTOR
CLAUDE W. WALZ
BY
ATTORNEY Patented Dec. 28, 1943

2,337,698

UNITED STATES PATENT OFFICE 2,337,698

BEET HARVESTER

Claude W. Walz, Pueblo, Colo.

Application March 18, 1940, Serial No. 324,645

33 Claims. (Cl. 55—107)

This invention relates to a beet harvester and has for its principal object the provision of a complete, highly efficient device or harvester which can be entirely supported and operated by a tractor and which will top the beets at the proper proportionate point for topping; which will pick up and pile the topped beet crowns; which will pull the topped beets, free them from adhering clods; which will pick up and pile the topped beets as desired for loading; and which will break the soil ahead of the pullers so as to reduce the size and amount of clods to a minimum.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

Fig. 1 is a side elevation of the improved beet harvester applied to a typical tractor.

Fig. 2 is a plan view thereof in place on the tractor.

Fig. 3 is a longitudinal sectional view taken on the line 3—3, Fig. 2.

Fig. 4 is a horizontal sectional view, taken on the line 4—4, Fig. 1.

Fig. 5 is a detail view of the cross bar employed for supporting the guide plate tongue member in the machine.

Fig. 6 is a detail view of the lower conveyor sprockets and shaft.

Fig. 7 is a fragmentary rear view of the harvester mechanism.

In the drawings various parts of a typical field tractor are illustrated and designated by numeral as follows: chassis 10, front guide wheels 11; rear drive wheels 12; rear axle 13; side power take-off pulley 14; rear power take-off shaft 15; and power lift shaft 31.

The improved beet harvester is designed to be secured to and to extend along one side of the tractor preferably, but not necessarily, the right side thereof as illustrated.

The harvester is applied to the tractor by securing two parallel, angle frame members 32 to each side of the tractor chassis and projecting them forward therefrom. A lateral beam 16 extends entirely across the chassis, supported by the frame members 32, and projects from both sides thereof. At the side of the tractor, the lateral beam 16 supports a forward, inverted, U-shaped frame 17.

Two side members 18 are secured at their forward extremities in vertically slotted openings 19 in the legs of the frame 17 and extend rearwardly therefrom. The two side members 18 are separated and supported at their rear extremities by means of a rear U-shaped frame 20 which is rigidly braced from the side members by means of diagonal braces 33. The rear U-shaped frame 20 is suspended on a link 21 from the lower extremity of a lifting lever 22. The lever 22 is pivoted at 23 on a longitudinal frame member 24. The rear extremity of the latter member is supported on a vertical post 34 which is secured by means of suitable cap screws 81 to the front face of an axle housing 78 which encloses the rear axle of the tractor.

It can be readily seen that, by swinging the lever 22 forward and back, the rear extremities of the side members 18 and the rear frame 20 may be raised and lowered through the medium of the link 21. The forward extremities of the side members 18 are simultaneously raised and lowered by means of connecting rods 25 which extend upwardly from each of the side frame members 18 to a pair of bell crank levers 26 pivoted on a cross rod 27 adjacent the top of the forward frame 17. The bell crank levers are swung by means of a second pair of connecting rods 28 which extend rearwardly to the lifting lever 22. The rods 28 connect at their forward extremities to arms 29 projecting downward from the bell crank levers 26. These arms preferably contain a series of rod openings 30 so that their effective lengths can be adjusted.

Thus, it can be seen that when the lever 22 is swung rearwardly, the bell crank levers 26 will swing upwardly and lift the forward extremities of the members 18 in the slotted openings 19. The amount of lift of the forward extremities, however, is less than the amount of lift of the rearward extremities due to the different points of attachment of the link 21 and the rods 25 to the lever 22. The tractor serves as a main frame and the two U-shaped members 17 and 20, with the side members 18 and associated parts, comprise a topping or supporting frame, and the latter serves to support topping mechanism described below.

Topping mechanism

The topping is done by means of a convexedly curved topping knife 35 supported between two knife arms 36 which extend rearwardly to pivotal connections 37 on the lower extremities of the rear frame 20. The knife is supported from a pair of guide or gauge arms 38 through the medium of connecting links 39. The guide arms are pivoted to the sides of the rear frame 20 above the knife arms 36 and extend generally horizontally forwardly and downwardly therefrom to a pivotal connection at 40 on a triangular guide plate 41.

The guide plate is supported in an upwardly inclined position immediately ahead of the knife by means of a projecting tongue member 42 which extends forwardly and upwardly through a slide guide 43 on a cross rod 44, whereby the upper forward end of the member 42 is supported for sliding pivotal movement. The cross rod 44 provides the mounting for the side members 18 in the slotted openings 19. The guide plate normally drags along the ground and over the crowns of the beets ahead of the knife and, when forced upward by a high beet the bar 42 slides forwardly through the guide 43 and swings upwardly about the axis of the rod 44, thereby lifting the knife 35 through the medium of the links 39.

A pair of sharp, rolling coulters 45 travel ahead of the knife and at each side thereof. The coulters are carried on the rear extremities of a pair of drag links 46 from a cross member in the forward frame 17 and are constantly urged downward against the ground by means of compression springs 47. Mud scrapers 48 are provided to scrape the mud and soil from the coulters. The latter serve to cut away spreading, flattened tops, if any.

The above described mechanism provides the means for cutting the crowns from the beets.

Top gathering mechanism

Means are provided for picking up the cut crowns and tops and removing them from the row before the beets are dug. The top removing or conveying means consists of a pair of endless conveyor chains 49 between which, spaced-apart flights 50 extend to support two spaced endless belts 51. The chains are trained over relatively large sprockets 52 at the rear and extend forwardly and upwardly over two smaller sprockets 53 at the front.

The smaller sprockets 53 are mounted on a transverse sprocket shaft 54 carried on journal brackets 55 from the frame 17. The large sprockets are secured on a sprocket shaft 56 journalled at the rearward extremity of a hinged conveyor frame 57. The forward extremity of the conveyor frame is swingingly mounted on the sprocket shaft 54. The rearward extremity of the conveyor frame is resiliently suspended from the rear frame 20 upon hanger rods 58 cushioned by means of compression springs 59. The height of the rearward extremity of the conveyor frame can be adjusted relative to the frame 20 by means of adjusting nuts 60.

A plurality of parallel, spring-mounting rods 61 extend between and are journalled in the large sprockets 52 forming an open barrel-like drum about which the belts 51 rotate. A pair of U-shaped wire springs are wrapped about and secured to each spring mounting rod. The extremities of each spring extend outwardly at each side of each belt to form spring fingers 62. The mounting rods project through one of the sprockets and the projecting portions are provided with cam followers 63 which contact and ride on an arcuate cam member 64 during a portion of the revolution of the large sprockets 52.

The cam member 64 is secured to the conveyor frame 57 and extends in an open circle partially and concentrically around the sprockets shaft 56. When the cam followers 63 are riding against the cam 64, the spring fingers extend radially outward. When the cam followers reach the open portion of the cam, the spring fingers can fold backward toward the shaft 56.

The cam member 64 is so positioned that the cam followers will strike it as they approach the bottom of the sprockets 52. This will cause the spring fingers to snap outwardly to a radial position to scoop up the severed beet crowns and carry them upwardly around the sprockets to the top thereof. The cam followers then leave the cams allowing the fingers to fold back so that the beet crowns remain on the belts 51. The tops and crowns are held on the conveyor belts by means of side plates 65 extending along the sprocket chains 49 throughout the length of the conveyor. The belts convey the tops and crowns forwardly and deposit them into a transverse conveyor which extends across the front of the tractor.

The transverse conveyor is supported by the forward angle frame 32 and consists of two separated, trough-like members 66 between which an endless traveling chain 67 is positioned. The chain 67 runs over sprockets at each extremity of the trough-like member 66. One of the sprockets is secured on a conveyor drive shaft 68 which is journalled on the extremity of the lateral beam 16. The beet crowns roll to the bottom of the channel formed by the members 66 and are carried to the opposite side of the tractor by the chain 67.

Both of the above described conveyors are driven from a longitudinally extending power shaft 69, which extends along the left side of the tractor. The power shaft is journalled adjacent its forward extremity in a bearing 70 on the lateral beam 16. The power shaft transmits power to the conveyor shaft 54 through a set of bevel gears 71 and simultaneously transmits power to the sprocket drive shaft 68, in a reverse direction, through a crossed belt 72. The power shaft is driven from the power take-off shaft 15 of the tractor through the medium of a transmission chain 73.

Digging mechanism

The beets are dug by means of a pair of inclined beet lifting plows 74, each plow being secured on one leg of an inverted, U-shaped, plow beam frame 75 which is vertically movable between pairs of guide rollers 76. The upper guide rollers are mounted on the arms of an upper, horizontal, U-shaped guide frame 77 secured to the rear face of the axle housing 78 on the tractor. The lower guide rollers 76 are mounted on the arms of a lower U-shaped guide frame 79, the side members of which extend forwardly beneath the axle housing 78 to a horizontal bar 80 which is projected outwardly from the transmission housing of the tractor. The bar 80 is supported by the post 34. The upper and lower guide frames 77 and 79 are rigidly connected together by means of suitable brace members 82. It can be seen that the plow beam frame is freely floating in the guide frames 77 and 79. It is suspended therein from a lift lever 83 secured on the power lift shaft 31 of the tractor. The power lift shaft is extended and journalled in ears 84 on the upper guide frame for this purpose. Adjusting bracket arms 85 are extended rearwardly from the plow beam frame 75 and provided with a vertical series of openings for adjustably receiving a cross rod 86. The cross rod 86 is connected to the lift lever 83 by means of chain links 87. Thus, by operating the power lift of the tractor the lifting plows can be raised above the ground or can be dropped to the proper digging position. The proper digging depth can be preset either by adjusting the position of the cross rod 86 in the bracket arms 85, or by means of a threaded adjusting crank 88. The crank 88 is threaded through a projecting portion of the plow beam frame and contacts the upper guide frame 77 to limit the downward movement of the plow beam frame.

In exceedingly hard ground, the lifting plows break loose large hard clods which are lifted with the beets. To prevent this, means are provided for breaking the soil ahead, and at each side of the beet row in advance of the plows. The latter means consists of two sets of soil breaking points 89. Each set is supported from one leg of the plow beam frame on a horizontal beam 90 rigidly braced by means of a brace bar 91. Each set consists of a plurality of pointed members extending into the ground. The first point 89 of each set barely enters the ground and each successive following point enters progressively deeper to progressively break the soil loose in advance of the lifting plows. The breaking points are inclined inwardly toward the beet row at their bottoms to loosen the soil adjacent the beets. Since the breaking points are carried by the plow beam frame 75 they rise from the ground when the latter is lifted.

*Beet gathering mechanism*

The incline of the beet lifting plows acts to gradually lift the beets from the ground and would ordinarily leave the beets upstanding above the ground surface. In this machine, however, a pair of gripping wheels 92, provided with relatively soft pneumatic tires 93, are positioned on an incline immediately back of the lifting plows. The tires pass on each side of each elevated beet as it leaves the plows and grip the beet between them.

The gripping wheels are mounted on inclined wheel shafts 94 which are journalled in suitable bearings in adjustable bearing brackets 95 secured to the bracket arms 85. The shafts 94 are driven rearwardly at their adjacent peripheries from a cross shaft 96 which is rotatively supported from the plow beam frame 75.

The cross shaft 96 is driven from a jack shaft 97, mounted on the rear of the tractor transmission case, through the medium of a flexible drive chain 98. The jack shaft is driven from the power shaft 69 through the medium of suitable bevel gears 99.

The gripping wheels rotate at relatively high speed and act to grip each beet as it leaves the lifting plows and to throw this beet rearwardly and upwardly. The beets may be allowed to fall to the ground surface where they will be exposed for gathering in any desired manner. It is preferred, however, to place an inclined receiving elevator at the rear of the tractor to receive the beets thrown rearwardly by the gripping wheels. Such an elevator is indicated in broken line at 100. This elevator may be employed to carry the beets to a receiving hopper, such as indicated in broken line at 101.

Occasionally, large earth clods will be lifted by the lifting plows and, if the clod is engaged by the gripping wheels, it will also be thrown into the receiving conveyor. To reduce such occurrences to a minimum, a metallic, toothed disc 102 is mounted below each gripping wheel on each of the shafts 94. These discs engage the clods flowing from the plows and crush and break them so that they cannot be thrown by the gripping tires.

*Operation*

It is believed that the operation of the machine will be apparent from the above description. Briefly, the tractor operator drives the tractor to a position alongside the beet row. He operates the tractor power lift to lower the plows into the ground and releases the lever 22 to lower the knife 35, the gauge plate 41, and the coulters 45 to the ground, and engages the power take-off clutch of the tractor to start the power shaft 69. He then drives along the side of the beet row keeping the gauge plate 41 in alignment with the beets.

The knife raises and lowers in accordance with the height of the beets and shears the crowns therefrom as it advances. It will be noted that when the plate 41 engages a high beet and swings upwardly, it also swings forwardly, due to the forward and upward swinging of the pivot ends 40 of the arms 38. Therefore, in passing off a high beet and onto a lower one, the gauge plate 41 moves not only downwardly but also rearwardly. This rearward component offsets some of the forward travel and thus insures the gauge plate and knife lowering in ample time to engage the next beet, even though it may be appreciably lower than the preceding one.

The spring fingers sweep the severed crowns onto the conveyors and they are carried to the opposite side of the machine. The breaking points 89 follow the knife to break the ground around the beets and the plows engage, pull and lift the beets into the path of the gripping wheels. The latter throw the beets to the gathering conveyor, which deposits them in the hopper 101 from which they may be dumped at convenient intervals.

It is desired to call attention to the fact that the gauge plate 41 is not maintained at a fixed angle to the gauge arms 38. This angle varies with the height of the beets. For instance, the gauge plate moves over a high beet at a much more gradual incline than over a low beet. This action eliminates breaking off the high beets from the side pressure of the gauge plate.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A beet topping machine comprising: a topping frame; a pair of hingedly mounted knife arms extending forwardly and downwardly from said frame; a knife extending between the extremities of said knife arms; gauge arms hinged to said frame and extending forward of said knife; links connecting said gauge arms with said knife arms; a gauge plate hinged to the forward extremity of said gauge arms; a supporting member extending forwardly from said gauge plate; and means for supporting the forward extremity of said latter member to maintain said gauge plate at a forward and upward angle.

2. A beet topping machine comprising: a topping frame; a pair of hingedly mounted knife arms extending forwardly and downwardly from said frame; a knife extending between the extremities of said knife arms; gauge arms hinged to said frame and extending forward of said knife; links connecting said gauge arms with said knife arms; a gauge plate hinged to the forward extremity of said gauge arms; a supporting member extending forwardly from said gauge plate; a guide member slidably receiving the forward extremity of said supporting member, the latter being free to slide and tilt therein.

3. A beet topping machine comprising: a forward frame; side bars hinged to and extending rearwardly from said forward frame; a rear frame secured to the rearward extremities of said side bars; means for raising and lowering said rear frame; hinged knife arms extending forwardly from the lower portion of said rear frame; a topping knife supported by said knife arms; gauge arms hinged to and extending forwardly from said rear frame; means for transmitting the movements of the gauge arms to the knife arms; a gauge plate hingedly supported by said gauge arms ahead of said knife; a supporting tongue extending forwardly from said gauge plate; and means on said forward frame for slidably supporting said tongue to maintain said gauge plate at an upward incline yet to allow free forward and back movement thereof.

4. In a beet topping machine of the type having a topping knife positioned to sever the crowns from the beets while the latter are in the ground, means for picking up the severed tops comprising: a fixed frame; a conveyor frame hinged to said fixed frame at its one extremity, the free extremity of the conveyor frame being positioned behind the topping knife; a rotating member at each extremity of said conveyor frame; an endless conveyor element trained about said rotating members; means at the free extremity of said conveyor frame for engaging the severed tops and placing them on the conveyor element; and resilient means yieldably supporting the free extremity of said conveyor frame from said fixed frame, thereby providing for movement of the top engaging means toward and away from said topping knife.

5. In a beet topping machine of the type having a topping knife positioned to sever the crowns from the beets while the latter are in the ground, means for picking up the severed tops comprising: a fixed frame; a conveyor frame hinged to said fixed frame at its one extremity and extending rearwardly therefrom so as to position the free extremity of the conveyor frame behind the topping knife; a rotary member at each extremity of said conveyor frame; an endless conveyor element trained about said rotary members; finger members movably carried on the rotary member at the free extremity of said conveyor frame; and means for rotating said last mentioned rotary member in a direction to move the fingers at the lower side of said last mentioned rotary member in a rearward direction for engaging the severed tops and moving them rearwardly away from said topping knife and then upwardly and forwardly onto the conveyor element.

6. In a beet topping machine of the type having a topping knife positioned to sever the crowns from the beets while the latter are in the ground, means for picking up the severed tops comprising: a fixed frame; a conveyor frame including conveyor means and secured to said fixed frame at its one extremity; a rotary member at the other extremity of said conveyor frame disposed rearwardly of said topping knife; an annular series of parallel rods in the rotary member at the other extremity of said conveyor frame; fingers projecting from said rods; means for driving the rotary member in a direction to move said fingers rearwardly away from said topping knife and means for turning said rods as they rotate to cause said fingers to engage the severed tops and first move the latter away from said knife and then place them on the conveyor means.

7. A beet harvester comprising means serving as a supporting frame, top severing knife means pivotally connected at its rear end with the rear portion of said frame and extending forwardly and downwardly, a gauge member pivotally connected with the front portion of said frame and extending rearwardly and downwardly to a point adjacent said top severing means, and means connecting said gauge member with said top severing means for adjusting the position of the latter.

8. A beet harvester comprising means serving as a supporting frame, top severing means movable generally vertically relative to said frame, a member connected with said frame for both generally longitudinal sliding and generally vertical swinging movement at its forward end, said member extending therefrom generally downwardly and rearwardly, gauge means at the rear end of said member, and means connecting the rear end of said member with said top severing means for controlling the position of the latter.

9. The combination with a tractor of the tricycle type having a relatively narrow body, centrally disposed front wheel means and relatively widely spaced rear wheels, of a beet harvester comprising means disposed generally at one side of the center line of the tractor and between the generally vertical longitudinal planes of the front wheel means and the rear wheel at said one side of the tractor for topping beets, means for receiving the beet tops and conveying them forwardly, and a transverse conveyor carried by the tractor for receiving tops from said top receiving and conveying means and discharging them at the other side of the tractor laterally outside the plane of the rear wheel at the other side of the tractor.

10. The combination with a tractor of the tricycle type having a relatively narrow body, centrally disposed front wheel means and relatively widely spaced rear wheels, of a beet harvester comprising means disposed generally at one side of the center line of the tractor and between the generally vertical longitudinal planes of the front wheel means and the rear wheel at said one side of the tractor for topping beets, pick-up means for picking up the beet tops including a member fixed to the front of the tractor at said one side thereof, an adjustable member reacting against the tractor at said one side thereof adjacent the rear portion of the tractor, and top engaging means swingably supported on said first member and connected at its rear portion with said adjustable member, and conveyor means having an end portion disposed in the space between said planes at said one side of the tractor for receiving said tops from said pick-up means and conveying them to the other side of the tractor.

11. In a beet topping machine, a generally vertically adjustable topping knife positioned to sever the crowns from the beets while the latter are in the ground, a beet engaging shoe disposed adjacent the topping knife and connected with the latter for adjusting it upwardly or downwardly according to the size of the beet, and means for picking up the severed tops comprising a rotary member disposed above and to the rear of said topping knife and finger members projecting from the rotary member for engaging the severed tops and moving them substantially directly rearwardly away from said beet engaging shoe and said topping knife to prevent the tops from collecting on either the gauge shoe or said topping knife.

12. A beet topping machine comprising supporting frame means, a pair of hingedly mounted knife arms extending forwardly and downwardly from said frame means, a knife extending between the ends of said knife arms, gauge arms hinged to said frame means and extending forward of said knife, beet engaging gauge means at the forward ends of said gauge arms, and means connecting the gauge arms with said knife arms whereby the position of said knife is controlled by said gauge means.

13. A beet topping machine comprising supporting frame means, a pair of hingedly mounted knife arms extending forwardly and downwardly from said frame means, a knife extending between the ends of said knife arms, gauge arms hinged to said frame means and extending forward of said knife, link means connecting said gauge arms with said knife arms, a downwardly and rearwardly extending beet engaging gauge member swingably connected at its upper and forward end with said supporting frame means, and means connecting the rear portion of said gauge member with the forward portions of said gauge arms.

14. A beet topping machine comprising supporting frame means, a pair of knife arms extending forwardly and downwardly from said frame means, a knife extending between the ends of said knife arms, a rotary pick-up device disposed rearwardly of said knife and between said forwardly extending knife arms, and means supporting said pick-up device from said supporting frame means.

15. A beet topping machine comprising a topping frame, a pair of hingedly mounted knife arms extending forwardly and downwardly from said frame, a knife extending between the extremities of said knife arms, gauge arms hinged to said frame and extending forward of said knife, links connecting said gauge arms with said knife arms, beet engaging gauge means connected with the forward extremities of said gauge arms, a supporting member extending forwardly from said gauge means, and means for supporting the forward extremity of said latter member to maintain said gauge means in a position to engage and move over the tops of the beets.

16. A beet topping machine comprising supporting frame means, a pair of members swingably connected at longitudinally spaced points, respectively, with said frame means, one of said members extending generally forwardly and the other extending generally rearwardly from said points of connection, top severing means connected with said forwardly extending member, beet engaging means connected with said rearwardly extending member, and motion reducing linkage connecting said members whereby a given displacement of said beet engaging means causes a proportionally smaller displacement of said top severing means.

17. A beet topping machine comprising supporting frame means, a pair of members swingably connected at longitudinally spaced points, respectively, with said frame means, one of said members extending generally forwardly and the other extending generally rearwardly from said points of connection, top severing means connected with said forwardly extending member, beet engaging means connected with said rearwardly extending member, and motion-reducing linkage connecting said members, comprising a lever pivoted to said frame means and connected with said rearwardly extending member and a link pivoted to said lever and said forwardly extending member, said link being pivoted to said lever at a point closer to the point of pivotal connection with said frame means than the distance between the axis of swinging movement of said forwardly extending member and the point of pivotal connection of said link therewith, whereby a given displacement of said beet engaging means causes a proportionally smaller displacement of said top severing means.

18. A beet topping machine comprising a main frame, a generally vertically adjustable longitudinally extending topping frame, top severing means carried by said topping frame, top pick-up means also carried by said topping frame, means connected with both ends of said topping frame for raising and lowering both ends of said topping frame, and top conveying means receiving tops from said pick-up means and supported at least in part by said main frame, said topping frame and said top conveying means being relatively movable.

19. A beet topping machine comprising a main frame, a generally vertically adjustable longitudinally extending topping frame, adjustable top severing means carried by one part of said topping frame, beet engaging gauge means carried by another part of said topping frame, and means carried by said topping frame for connecting said gauge means with said adjustable top severing means whereby said gauge means is adapted to adjust the position of said top severing means, and means connected with both ends of said topping frame for raising and lowering both ends of said topping frame substantially the same amount, whereby both the top severing means and the gauge means may be raised and lowered together without materially disturbing the relation therebetween.

20. A beet topping machine comprising a forward frame, side bars hinged to and extending rearwardly from said forward frame, a rear frame secured to the rearward extremities of said side bars, means for raising and lowering said rear frame, hinged knife arms extending forwardly from the lower portion of said rear frame, a topping knife supported by said knife arms, gauge arms hinged to and extending forwardly from said rear frame, means for transmitting the movements of the gauge arms to the knife arms, gauge means hingedly supported by said gauge arms ahead of said knife, a supporting tongue extending forwardly from said gauge means, and means on said forward frame for slidably supporting said tongue to maintain said gauge means at an upward incline yet to allow free forward and back movement thereof.

21. A beet topping machine comprising a main frame, a rear frame, hinged knife arms extending forwardly from said rear frame, a topping knife supported by said knife arms, movable gauge means disposed ahead of said knife and extending downwardly and rearwardly from its forward end toward said topping knife, means for transmitting the movements of said gauge means to said knife arms, and means supporting said gauge means for both pivotal and forward and back movement relative to the main frame.

22. A beet topping machine comprising a main frame, a rear frame, hinged knife arms extending forwardly from said rear frame, a topping knife supported by said knife arms, gauge arms hinged to and extending forwardly from said rear frame, means for transmitting the movements of the gauge arms to the knife arms, gauge means pivotally connected with the forward ends of said gauge arms ahead of said knife, and means supporting said gauge means for both pivotal and forward and back movement relative to the main frame.

23. A beet topping machine comprising a frame, a pair of knife arms pivoted at their rear ends to and extending forwardly from said frame, a topping knife carried at the forward ends of said knife arms, a pair of gauge arms pivoted at their rear ends and extending forwardly from said frame ahead of said knife, a link connecting each gauge arm with the associated knife arm, and beet engaging gauge means connected with the forward ends of said gauge arms.

24. A beet topping machine comprising a frame, a pair of knife arms pivoted at their rear ends to and extending forwardly from said frame, a topping knife carried at the forward ends of said knife arms, a pair of gauge arms pivoted at their rear ends and extending forwardly from said frame ahead of said knife, a link connecting each gauge arm with the associated knife arm, beet engaging gauge means swingably connected with the forward ends of said gauge arms, and means for maintaining said gauge means at an upward and forward incline.

25. In a beet topping machine of the type having a topping knife positioned to sever the crowns from the beets while the latter are in the ground, means for picking up the severed tops comprising a rotary member disposed rearwardly and generally above said topping knife, a plurality of generally outwardly extending fingers movably mounted on said rotary member, means for driving the rotary member in a direction to move said fingers rearwardly away from said topping knife and means for turning said fingers to cause them to engage the severed tops and first move the latter away from said knife.

26. A beet topping machine comprising a topping frame, a pair of hingedly mounted knife arms pivoted to the rear part of said frame and extending forwardly from their points of connection with said frame, a knife extending between the forward extremities of said knife arms, a rotary member disposed rearwardly of said knife and having at least the major portion thereof generally between said knife arms, a plurality of generally outwardly extending fingers movably mounted on said rotary member, means for driving the rotary member in a direction to move said fingers rearwardly away from said topping knife and means for turning said fingers to cause them to engage the severed tops and first move the latter away from said knife.

27. A beet topping machine comprising a topping frame, a pair of hingedly mounted knife arms pivoted to the rear part of said frame and extending forwardly from their points of connection with said frame, a knife extending between the forward extremities of said knife arms, a plurality of rotary top-engaging fingers disposed rearwardly of said topping knife and generally between said knife arms, and means for rotating said fingers to carry them downwardly and rearwardly generally toward said knife and then rearwardly and upwardly away from said knife.

28. A beet topping machine comprising supporting frame means, a pair of knife arms carried by said frame means, a topping knife extending between the ends of said knife arms, a rotary top pick-up device disposed adjacent said knife generally in a position between said knife arms and having top-engaging elements adapted to engage tops after they are severed by said knife, means for rotating said pick-up device in a direction to carry said elements and the tops engaged thereby generally rearwardly away from the knife, and means supporting said pick-up device from said supporting frame means.

29. A beet topping machine comprising a main frame, a generally vertically adjustable longitudinally extending topping frame, top severing means carried by said topping frame, top pick-up means also carried by said topping frame, means connected with both ends of said topping frame for raising and lowering both ends of said topping frame, top conveying means, means supporting said top conveying means in a position adjacent said pick-up means so as to receive tops therefrom, said topping frame and said top conveying means being relatively movable.

30. A tractor mounted beet harvester comprising a generally depending support adapted to be fixed to the tractor, a generally U-shaped knife unit having a forward cutting section and pivoted at its rear ends to said support, means serving as a forward support adapted to be connected with the tractor, gauge means movably connected with said forward support means and adapted to engage beets as the harvester passes down a row of beets and to move into different positions according to the size of the beets, and motion-transmitting means operatively connecting said gauge means with said knife unit for adjusting the position of the cutting section thereof.

31. In a beet topping machine, supporting means, a pair of substantially horizontal generally longitudinally extending knife arms having forward and rear ends and pivotally connected adjacent their rear ends with said supporting means for generally vertical swinging movement, a topping knife connected to the forward ends of said knife arms, means engageable with the crowns of the beets and connected with said supporting means and movable into different positions according to the height of the beet above the ground, and means connected with at least one of said arms and with said movable beet-engaging means for swinging said knife generally vertically to raise or lower the latter according to the size of the beet so as to top the beets at the desired point.

32. A beet topping machine comprising supporting frame means, a pair of members swingably connected at longitudinally spaced points, respectively, with said frame means, one of said members extending generally forwardly and the other being a rigid member extending generally rearwardly from said points of connection, top severing means carried by said forwardly extending member, beet engaging means carried by said rearwardly extending member, means connecting said members whereby upward movement of said rearwardly extending member due to said beet engaging means engaging a beet changes the position of the forwardly extending member that carries said top severing means.

33. A beet topping machine comprising a main frame, a generally vertically adjustable longitudinally extending topping frame, top severing means carried by said topping frame including a pair of knife arms extending generally horizontally forwardly and pivoted at their rear ends to said frame and a convexedly curved topping knife supported at the forward ends of said knife arms, top pick-up means also carried by said topping frame at the rear thereof and comprising movable top-engaging means disposed generally rearwardly of said knife and between said knife arms, and top conveying means supported at least in part by said topping frame generally in front of said pick-up means for receiving tops from said pick-up means.

CLAUDE W. WALZ.